United States Patent
Moon et al.

(10) Patent No.: US 9,224,093 B2
(45) Date of Patent: Dec. 29, 2015

(54) METHOD OF EVALUATING VALUE FOR REFERENCED INFORMATION AND APPARATUS THEREOF

(71) Applicant: KOREA INSTITUTE OF SCIENCE AND TECHNOLOGY INFORMATION, Daejeon (KR)

(72) Inventors: Young Ho Moon, Seoul (KR); Kang Hoe Kim, Seoul (KR); Seon Ho Kim, Seoul (KR); Woon Dong Yeo, Seoul (KR); Jae Woo Kang, Seoul (KR)

(73) Assignee: Korea Institute of Science & Technology Information, Daejeon (KR)

( * ) Notice: Subject to any disclaimer, the term of this patent is extended or adjusted under 35 U.S.C. 154(b) by 237 days.

(21) Appl. No.: 13/726,221

(22) Filed: Dec. 24, 2012

(65) Prior Publication Data

US 2014/0101087 A1 Apr. 10, 2014

(30) Foreign Application Priority Data

Oct. 8, 2012 (KR) ........................ 10-2012-0111317

(51) Int. Cl.
| | | |
|---|---|---|
| *G06N 3/08* | (2006.01) | |
| *G06N 5/02* | (2006.01) | |
| *G06K 9/62* | (2006.01) | |
| *G06N 99/00* | (2010.01) | |
| *G06F 17/30* | (2006.01) | |

(52) U.S. Cl.
CPC ............ *G06N 5/02* (2013.01); *G06F 17/30014* (2013.01); *G06K 9/6269* (2013.01); *G06N 3/08* (2013.01); *G06N 99/005* (2013.01)

(58) Field of Classification Search
USPC .......................................... 706/14, 16, 20, 46
See application file for complete search history.

*Primary Examiner* — Jeffrey A Gaffin
*Assistant Examiner* — Nathan Brown, Jr.
(74) *Attorney, Agent, or Firm* — Park, Kim & Suh, LLC (57) ABSTRACT

A method of evaluating a value of reference information and an apparatus for evaluating a value of reference information are disclosed. According to an embodiment of the present invention, the method includes calculating similarity values of reference relationships between the subject document and each of neighbor documents, respectively, and summing the calculated similarity values to calculate a first sum, multiplying each of the similarity values of reference relationships between the subject document and each of the neighbor documents by a corresponding value of reference information of the first reference document for each of the neighbor documents, and summing the multiplied values to calculate a second sum, and evaluating a value of reference information using a ratio of the first and second sums.

8 Claims, 12 Drawing Sheets

| Reference document ID | Proposed method | Referenced number of times | Ranks evaluated by author | Author's comment on reference document |
|---|---|---|---|---|
| s2.0-33745947692 | 374.97 | 6597 | 2 | First to find and report basic phenomenon |
| s2.0-26544437684 | 363.39 | 4408 | 2 | First to find and report basic phenomenon |
| s2.0-20444406055 | 47.07 | 3187 | 5 | First to realize and report essential part of experiment |
| s2.0-0034609841 | 26.48 | 620 | | |
| s2.0-0024064196 | 18.85 | 368 | | |
| s2.0-0031235411 | 16.70 | 226 | 4 | Specifically and symetically explain principle explaining essential result |
| s2.0-18244365345 | 8.15 | 162 | | |
| s2.0-0031235328 | 7.45 | 136 | 6 | Generally similar to subject study. "Vlasov, Yu.A.,&" |
| s2.0-20344389790 | 5.50 | 58 | 1 | Especially similar to subject study and used in providing idea and explaining result |
| s2.0-0008267471 | 4.39 | 82 | 14 | Provide idea to one part |
| s2.0-34248380157 | 3.13 | 40 | | |
| s2.0-31144452275 | 2.96 | 28 | | |
| s2.0-0037505212 | 2.77 | 110 | | |
| s2.0-0003392447 | 2.57 | 5581 | 12 | Provide principle explaining element (peripheral) result |
| s2.0-34548205322 | 2.31 | 29 | | |
| s2.0-0033874564 | 2.29 | 128 | | |
| s2.0-34047253614 | 1.69 | 16 | 6 | Generally similar to subject study |
| s2.0-0000389489 | 1.59 | 2553 | 12 | Provide principle explaining element (peripheral) result |
| s2.0-33845409047 | 1.29 | 15 | 6 | Generally similar to subject study |
| s2.0-40849151926 | 1.28 | 12 | 9 | Generally similar to subject study |
| s2.0-0007000140 | 1.17 | 34 | | |
| s2.0-4243269065 | 1.12 | 12 | 9 | Generally similar to subject study |
| s2.0-34547132077 | 1.03 | 13 | 14 | Provide idea to one part |
| s2.0-0344371332 | 0.99 | 36 | | |
| s2.0-67649645392 | 0.94 | 0 | | |
| s2.0-34247185780 | 0.91 | 55 | | |
| s2.0-34548082844 | 0.85 | 11 | | |
| s2.0-33845659820 | 0.65 | 7 | | |
| s2.0-69249176061 | 0.61 | 3 | 9 | Generally similar to subject study |

FIG. 8

| Reference document ID | Proposed method | Referenced number of times | Ranks evaluated by author | Author's comment on reference document |
|---|---|---|---|---|
| s2.0-0030248270 | 10.42012 | 328 | 8 | Used in building thesis and analyzing result |
| s2.0-0029787599 | 10.37258 | 434 | 9 | Used in building thesis and analyzing result |
| s2.0-0036847848 | 3.782942 | 131 | 4 | Used in inspiring idea |
| s2.0-0034927750 | 3.618609 | 270 | | |
| s2.0-0036141148 | 3.522303 | 104 | 1 | Very important for planning next step in process of article |
| s2.0-0035283232 | 3.194858 | 55 | 7 | Used in inspiring idea and analyzing result |
| s2.0-0037192815 | 2.426942 | 89 | | |
| s2.0-0025883342 | 2.239933 | 9786 | | |
| s2.0-0032621790 | 1.948763 | 122 | 4 | Used in analyzing experiment result |
| s2.0-0035800775 | 1.872447 | 69 | 10 | Referenced for proceeding experiment |
| s2.0-0030712362 | 1.854472 | 223 | 3 | Used in planning next step in building and proceeding thesis of article |
| s2.0-0035092052 | 1.733593 | 83 | 6 | Used in proceeding thesis |
| s2.0-0031848185 | 1.538286 | 123 | 14 | Referenced as knowledge necessary for proceeding experiment |
| s2.0-0030601141 | 1.533237 | 109 | | |
| s2.0-0037637417 | 1.500397 | 75 | | |
| s2.0-0031788435 | 1.474726 | 81 | | |
| s2.0-0036467584 | 1.436812 | 187 | 13 | Result analysis |
| s2.0-0034523456 | 1.375947 | 63 | | |
| s2.0-0031964445 | 1.283126 | 64 | | |
| s2.0-0141681999 | 1.222379 | 25 | 15 | Referenced in inspiring idea |
| s2.0-77954657196 | 1 | | | |
| s2.0-0032054569 | 0.834614 | 21 | | |
| s2.0-20244364226 | 0.825191 | 62 | | |
| s2.0-00846769263 | 0.829039 | 1248 | 1 | Very important for building thesis of article |
| s2.0-22944457184 | 0.671927 | 115 | | |
| s2.0-0034972382 | 0.49513 | 33 | 12 | Used in inspiring idea |

FIG. 9

| | Random | Referenced number of times | Present embodiment |
|---|---|---|---|
| Author 1 | 0.26 (=1/39 * 10) | 0.50 | 0.60 |
| Author 2 | 0.23 (=1/43 * 10) | 0.40 | 0.70 |
| Average | 0.25 | 0.45 | 0.65 |

FIG. 10

$$\text{ROC-10} = \frac{\sum_{i}^{10} w_j}{\sum_{i}^{10} u_j}$$

METHOD OF EVALUATING VALUE FOR REFERENCED INFORMATION AND APPARATUS THEREOF

This application claims the priority benefit of Korean Application No. 10-2012-0111317, filed on Oct. 8, 2012, which is hereby incorporated by reference as if fully set forth therein.

BACKGROUND OF THE INVENTION

1. Field of the Invention

The present invention relates to a method of evaluating a value of reference information and an apparatus of evaluating a value of reference information.

2. Discussion of the Related Art

Typically, in documents providing information such as articles, journals, and patent documents, there are other documents that the documents cite or reference. Here, "document" is a general term for papers, records and electronic files containing information. Hereinafter, reference information or a reference document includes both a document referenced for writing a certain document and a document an author acknowledged as a reference document. For example, when an author submits an article about a certain study to an academic journal, reference documents referenced in writing the document are generally listed in the bibliography and the like.

Figure 1:
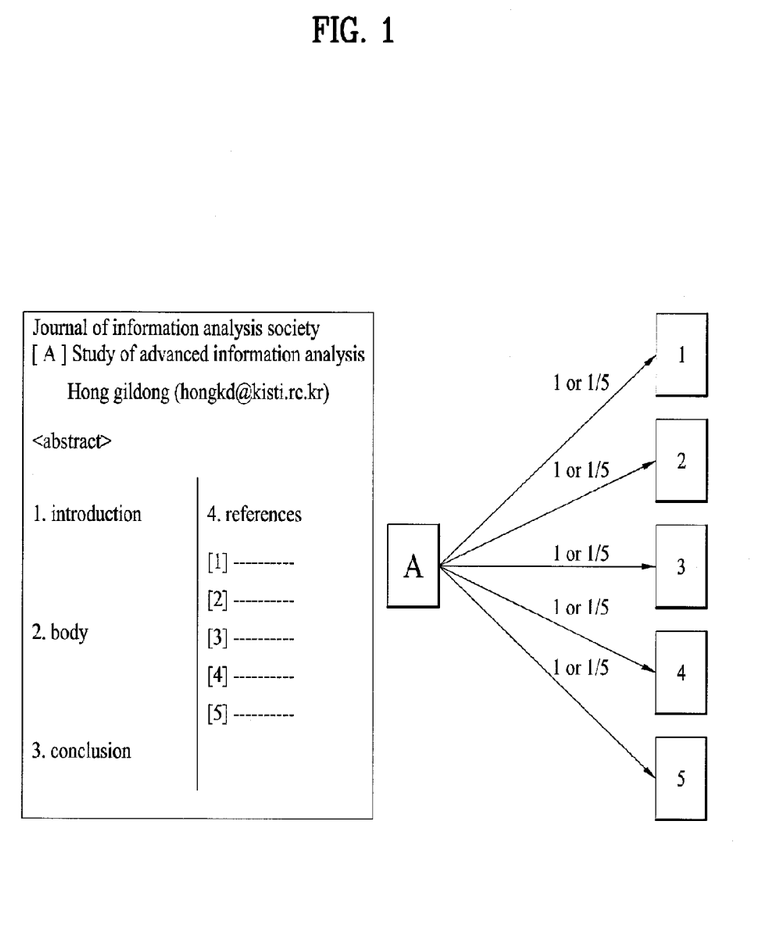
FIG. 1 is a diagram showing a value of reference documents or reference information.

FIG. 1 illustrates an example of a value of a reference document or reference information. For example, it is assumed that an author named Hong Gildong contributed an article A titled "Study of advanced information analysis" to the Journal of the Information Analysis Society, and the article A consists of an introduction, a body, a conclusion, and finally a bibliography listing 5 reference documents, for example.

Previously, a degree of influence or a value of a reference document for a certain document has been equally evaluated. In the above example, a degree of influence or a value of each of the reference documents 1, 2, 3, 4 and 5 for the article A may be evaluated as 1 or 1/5 (the number of a given reference document to the number of all of the reference documents). However, by evaluating a value, a degree of influence or importance of each of the reference documents as described above, it may not be possible to evaluate a respective value of each of the reference documents for an information document. Strictly speaking, in the above example in which all of the reference documents are equally evaluated as 1 or 1/5, such evaluation is not useful in determining which one of the reference documents is important. Therefore, a user may not be able to determine which of the reference documents is important when he references the reference documents through the information document.

SUMMARY OF THE INVENTION

Accordingly, the present invention is directed to a method of evaluating a value of reference information and an apparatus thereof that substantially obviate one or more problems due to limitations and disadvantages of the related art.

An object of the present invention is to provide a method of evaluating a value of reference information and an apparatus of evaluating a value of reference information.

Another object of the present invention is to provide a method of evaluating a value of reference information and an apparatus of evaluating a value of reference information capable of evaluating values, influence, etc. of a reference document for an information document which reference the reference document.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure certainly pointed out in the written description and claims hereof as well as the appended drawings.

To achieve these objects and other advantages and in accordance with the purpose of the invention, as embodied and broadly described herein, a method of evaluating a value of reference information includes a first step of receiving a request to evaluate a value of reference information of a first reference document among reference documents of a subject document, a second step of calculating similarity values of reference relationships between the subject document and each of neighbor documents, respectively, and summing the calculated similarity values to calculate a first sum, the neighbor documents referencing the first reference document, a third step of multiplying each of the similarity values of reference relationships between the subject document and each of the neighbor documents by a corresponding value of reference information of the first reference document for each of the neighbor documents, and summing the multiplied values to calculate a second sum, a fourth step of updating an initial value of a value of the reference information of the first reference document for the subject document by using a ratio of the second sum to the first sum, and a fifth step of applying the second to fourth steps to the reference documents, to update values of the reference information for each of the reference documents.

The similarity values of reference relationships between the subject document and each of the neighbor documents may be calculated using a bibliographic coupling. The method may further include iterating the second to fifth steps at least one time.

The method may further include expressing the updated values in the fifth step as values of reference information of the first reference document for the subject document.

In another aspect of the present invention, an apparatus of evaluating a value of reference information includes a reference information storage unit for storing initial values of values for reference information of reference documents for a subject document, a value calculation unit for receiving a request to evaluate a value of reference information of a first reference document for the subject document from a user, for calculating similarity values of reference relationships between the subject document and each of neighbor documents, the neighbor documents referencing the first reference document, and for performing operations including a first calculation step of summing the calculated similarity values to calculate a first sum, a second calculation step of multiplying each of the similarity values of reference relationships between the subject document and each of the neighbor documents by a corresponding value of reference information of the first reference document for each of the neighbor documents and summing the multiplied values to calculate a second sum, and a step of updating the initial value of the value of reference information of the first document for the subject document by using a ratio of the second sum to the first sum, and an information output unit for outputting the value of reference information of the first reference document for the subject document by using the ratio of the second sum to the first sum.

The value calculation unit may perform the operations on the reference documents to update values for reference information of the reference documents, and store the updated values in the reference information storage unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 7 is a table showing an evaluation result of influence of reference documents on the certain document, for verifying the embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, embodiments of the present invention are described with reference to the accompanying drawings.

Figure 2:
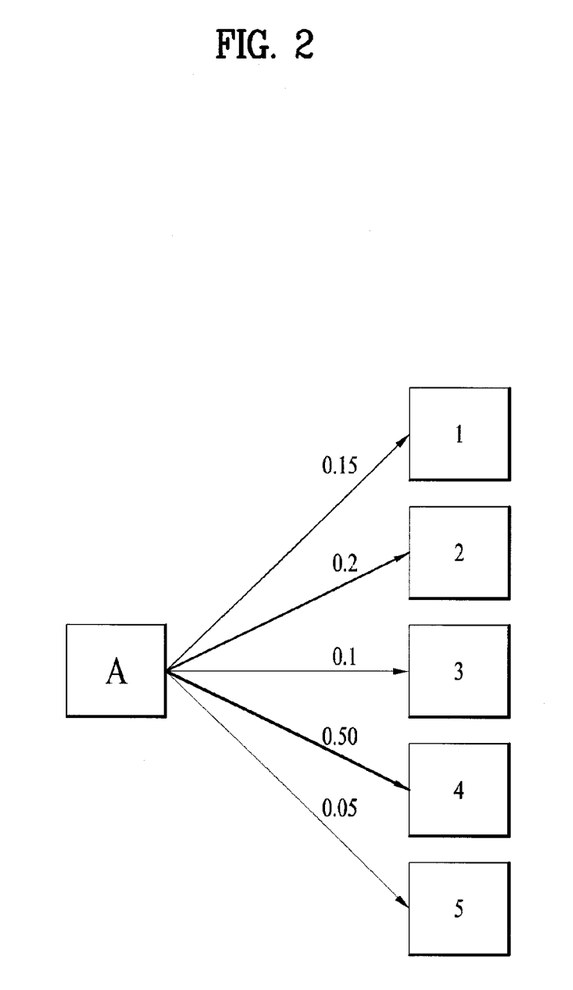
FIG. 2 is a diagram showing an evaluation result of values of reference documents for an information document according to an embodiment of the present invention.

FIG. 2 shows a result of evaluating values of reference documents for an information document according to an embodiment of the present invention. The embodiment of the present invention is described below with reference to FIG. 2.

For ease of explanation, it is assumed that documents 1, 2, 3, 4 and 5 are reference documents of the information document A. In the embodiment of the present invention, a value or a degree of influence of each of the reference documents for the information document A may be differently evaluated. In this example, if the value of all of the reference documents for the document A is 1, the example in FIG. 2 shows that a degree of influence or a value of the document 1 for the document A is 0.15, a degree of influence or a value of the document 2 for the document A is 0.2, a degree of influence or a value of the document 3 for the document A is 0.1, a degree of influence or a value of the document 4 for the document A is 0.50, and a degree of influence or a value of the document 5 on the document A is 0.05.

As such, according to the embodiment of the present invention, influence or values of the reference documents may be differently evaluated, and a user may identify a reference document which has the most influence on the document A. Even when each of the reference documents contributes to different parts of the document A, influence or values of each of the reference documents on the document A may be objectively evaluated.

According to the embodiment of the present invention, values or degrees of influence of the reference documents for the document A may be obtained from reference relationships among a plurality of reference documents.

Figure 3:
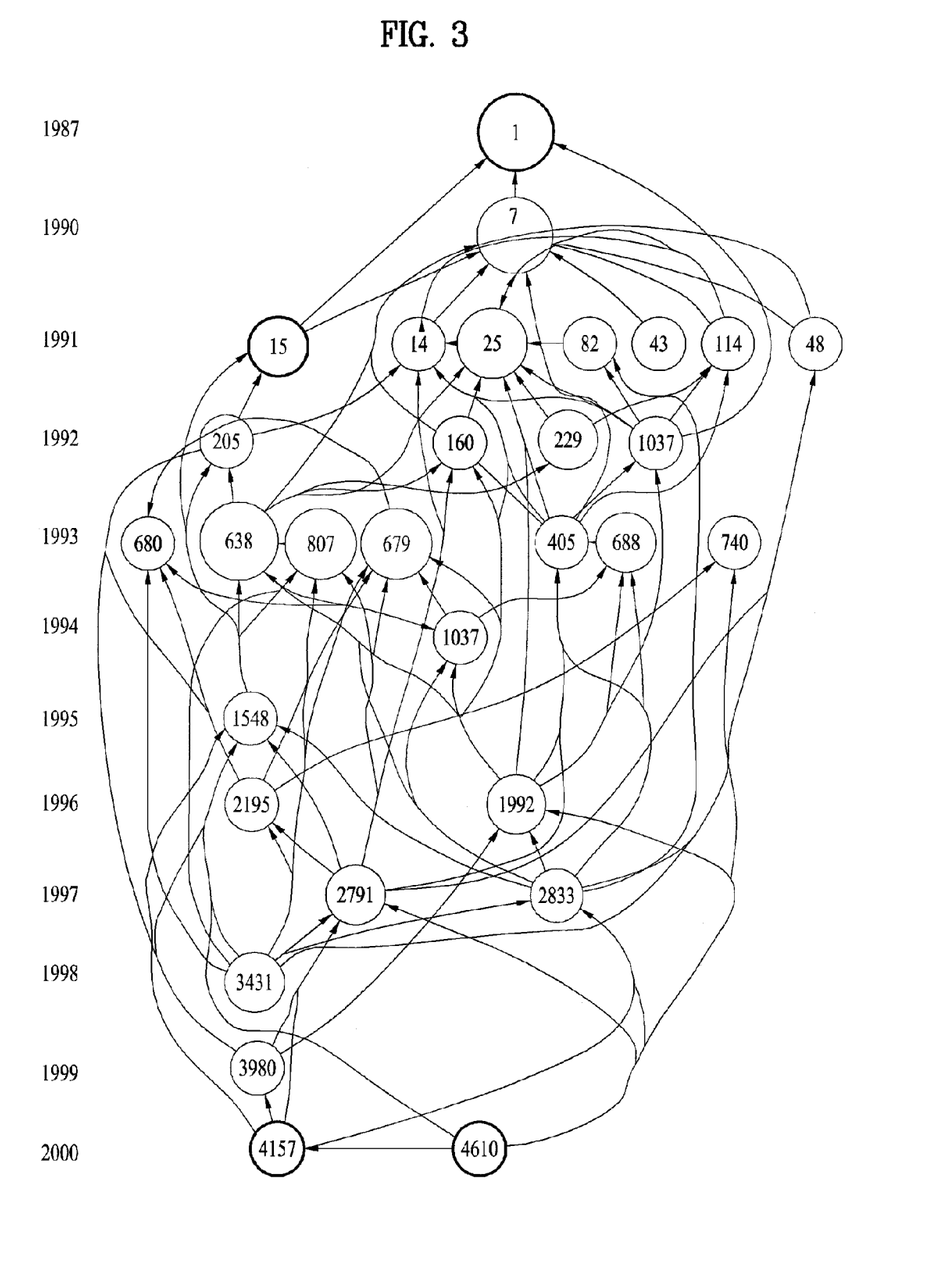
FIG. 3 is a diagram showing relationships among a plurality of reference documents.

FIG. 3 shows reference relationships among a plurality of reference documents. The reference documents are identified by the numbers in circles. The numbers in the vertical line in the left hand represent the years when each of the reference documents was published, issued or written. For ease of explanation, an example of issuing year is described, but years or time related to the documents may be used as well. For example, if it is assumed that the years are issuing years, the document 1 was issued in 1987. For ease of explanation, a description will be given with reference to issuing years.

Arrows represent the relationship between two reference documents. A document in a circle which an arrow reaches was referenced by another document, and a document in a circle from which an arrow originates references another document.

For example, it is shown that a document 15 issued in 1995 references a document 1 issued in 1987. As another example, a document 4610 issued in 2000 references a document 4157 issued in the same year. In this manner, reference relationships among a plurality of reference documents may be represented in chronological order. The more arrows reach a reference document, the more the reference document was referenced.

Figure 4:
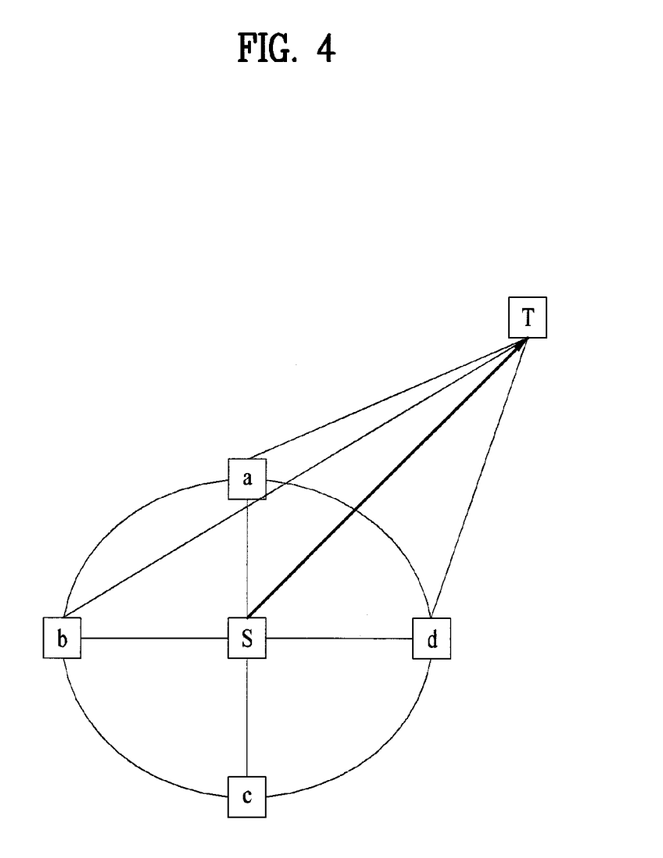
FIG. 4 is a diagram illustrating the embodiment of the present invention in which relationships among reference documents are evaluated.

FIG. 4 illustrates the embodiment of the present invention in which reference relationships among reference documents are evaluated. As in FIG. 3, when reference documents have reference relationships, a plurality of documents may reference a reference document. In FIG. 4 in which a document S, a document a, a document b, a document c, and a document d reference a document T, the value of the document T for the document S may be evaluated according to the embodiment of the present invention.

For convenience, the document S is referred to as a subject document, the document T is referred to as a reference document of the document S or reference document, the document a, the document b, the document c and the document d are referred to as neighbor documents. The neighboring documents reference the same reference document as the subject document S, in the relationship between the subject document and reference document.

With the relationship, evaluation of the document T for the document S may be represented as follows:

$$\vec{ST} = \frac{\overline{aS} \cdot \vec{aT} + \overline{bS} \cdot \vec{bT} + \overline{cS} \cdot \vec{cT} + \overline{dS} \cdot \vec{dT}}{\overline{aS} + \overline{bS} + \overline{cS} + \overline{dS}} \quad \text{[Equation 1]}$$

Here, the relationship between the neighbor document a and the subject document S, $\overline{aS}$, may be represented by a bibliographic coupling, for example. The bibliographic coupling establishes a relationship between documents referencing a common document so that it is assumed that several documents are related with each other when the several documents reference one or more common documents. That is, it is assumed that bibliographically-coupled documents focus on a similar subject matter, and the numbers of couplings of bibliographically-coupled documents and documents commonly referenced are measured.

Accordingly, $\overline{aS}$ may be represented as Equation 2 utilizing a cosine similarity.

$$\overline{aS} = \frac{a \cdot S}{\|a\| \, \|S\|} = \frac{\sum_{i=1}^{n} a_i \times S_i}{\sqrt{\sum_{i=1}^{n} (a_i)^2} \sqrt{\sum_{i=1}^{n} (S_i)^2}} \quad \text{[Equation 2]}$$

The value of Equation 2 may be determined based on the number of documents commonly referenced by two documents, among documents referenced by each of the two documents.

Further, the reference relationship between the neighbor document a and the reference document T, $\vec{aT}$, may be calculated for the documents a and T in a similar manner to Equation 1 (the reference relationship between the subject document S and the reference document T). However, at the time of the first iteration calculation in iteration calculations to be described below, i.e., an initial value may be assigned a certain value based on the number of reference documents or "1/(the number of neighbor documents of the document S)" or "1/(the number of all documents referenced by the document S).

With the reference relationship in FIG. 4, the reference relationship between the document S and the reference document T may also be represented by Equation 3.

$$\vec{ST} = \frac{\overline{aS} \cdot \vec{aT} + \overline{bS} \cdot \vec{bT} + \overline{cS} \cdot \vec{cT} + \overline{dS} \cdot \vec{dT} + \overline{SS} \cdot \vec{ST}}{\overline{aS} + \overline{bS} + \overline{cS} + \overline{dS} + \overline{SS}} \quad \text{[Equation 3]}$$

Although a method of evaluating reference documents using Equation 1 will be described, it may also be performed using Equation 3.

In order to evaluate a value of a reference relationship of the reference document T for the subject document S, at the first iteration step, $\overline{aS}$, $\overline{bS}$, $\overline{cS}$, and $\overline{dS}$ may be calculated. Each of them represents a similarity value between reference documents of the subject document S and those of the neighbor document a, a similarity value between reference documents of the subject document S and those of the neighbor document b, a similarity value between reference documents of the subject document S and those of the neighbor document c, and a similarity value between reference documents of the subject document S and those of the neighbor document d, respectively. As stated above, similarity values of the reference documents may be calculated using a bibliography coupling, for example.

Then, each of $\vec{aT}$, $\vec{bT}$, $\vec{cT}$, and $\vec{dT}$ is calculated.

These values represent a value of the reference relationship of the reference document T for the neighbor document a, a value of the reference relationship of the reference document T for the neighbor document b, a value of the reference relationship of the reference document T for the neighbor document c, and a value of the reference relationship of the reference document T for the neighbor document d.

Here, in order to calculate a value of the reference relationship of the reference document T for the subject document S, a value of the reference relationship of the reference document T for the neighbor document a is necessary. On the contrary, in order to calculate the value of the reference relationship of the reference document T for the neighbor document a, the value of the reference relationship of the reference document T for the subject document S is necessary.

Because values to be calculated, i.e., a value $(\vec{ST})$ of the reference relationship of the reference document T for the subject document S and a value $(\vec{aT})$ of the reference relationship of the reference document T for the neighbor document a mutually contribute to their calculations, calculation of the above values is iterated for each of the documents according to the number of iterations.

By doing so, even if initial values of the values of the reference relationships are equally set as in FIG. 4, the values of the reference relationship of the reference document T for the subject document S may converge on a certain value as calculations are iterated. Accordingly, once a threshold value for determining a convergence value is determined or the number of iterations is determined, the value of the reference relationship among the reference document T for the subject document S may be determined.

Figure 5:
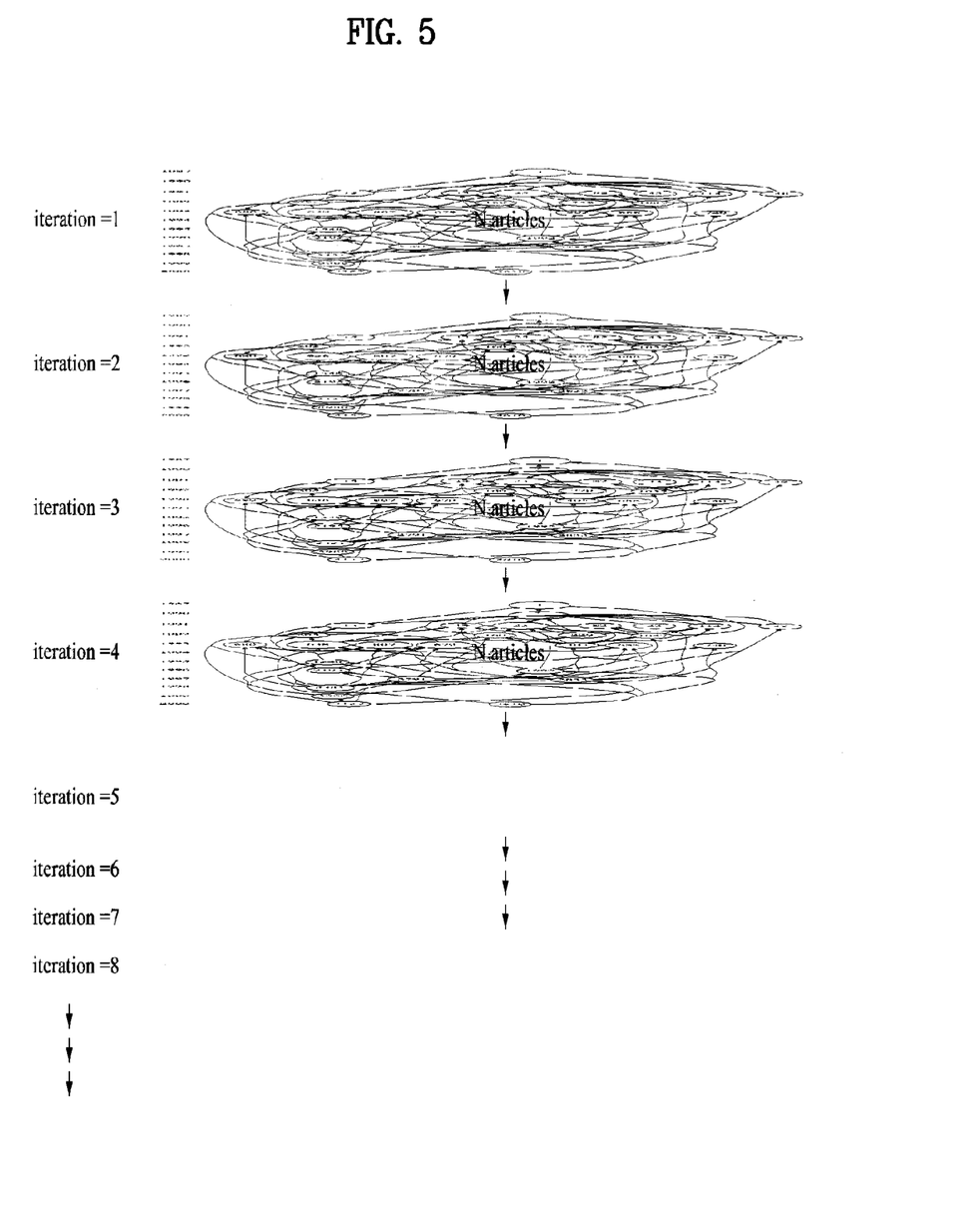
FIG. 5 is a diagram illustrating an example in which operations according to Equation 1 or Equation 3 are applied to reference relationships among N articles.

FIG. 5 shows an example in which operation according to Equation 1 or Equation 3 is applied to reference relationship of N articles, according to an embodiment of the present invention. In order to verify the embodiment of the present invention, a database is used that stores about 20,000,000 articles and information about the reference relationships therebetween.

An initial value of the document 2 for the document 1 may be determined arbitrarily. The initial value may be determined as the number of neighbor documents as described above, or may be determined as the number representing 1/n (n denotes the number of the reference documents) as in FIG. 1.

Among these, in order to evaluate a value of a reference relationship between two documents having the established reference relationship, at iteration=1 a value of a reference relationship of the document 2 for the document 1 is calculated. Then, the value of the reference relationship of the document 2 for the document 1 is updated from the initial value.

At iteration=2, the value of the reference relationship of the document 2 for the document 1 is calculated, and the value of the reference relationship of the document 2 for the document 1 is updated from the value at iteration=1.

Likewise, at iteration=3, the value of the reference relationship of the document 2 for the document 1 is calculated, and the value of the reference relationship of the document 2 for the document 1 is updated from the value at iteration=2.

Operations of Equation 1 or Equation 3 as above are performed for iterations=4, 5, 6, 7, 8 . . . . Iteration is performed until the total sum of changes in values ($\vec{ST}$) of reference relationships is a threshold or less, or the number of iterations reaches a maximum allowable value.

The above scheme to search documents having reference relationships is referred to as a cooperative filtering algorithm. In the embodiment of the present invention, similarity values of related documents or reference documents searched through the cooperative filtering algorithm are calculated by using a bibliographic coupling, and values of the reference information are evaluated in an iterative manner.

Figure 6:
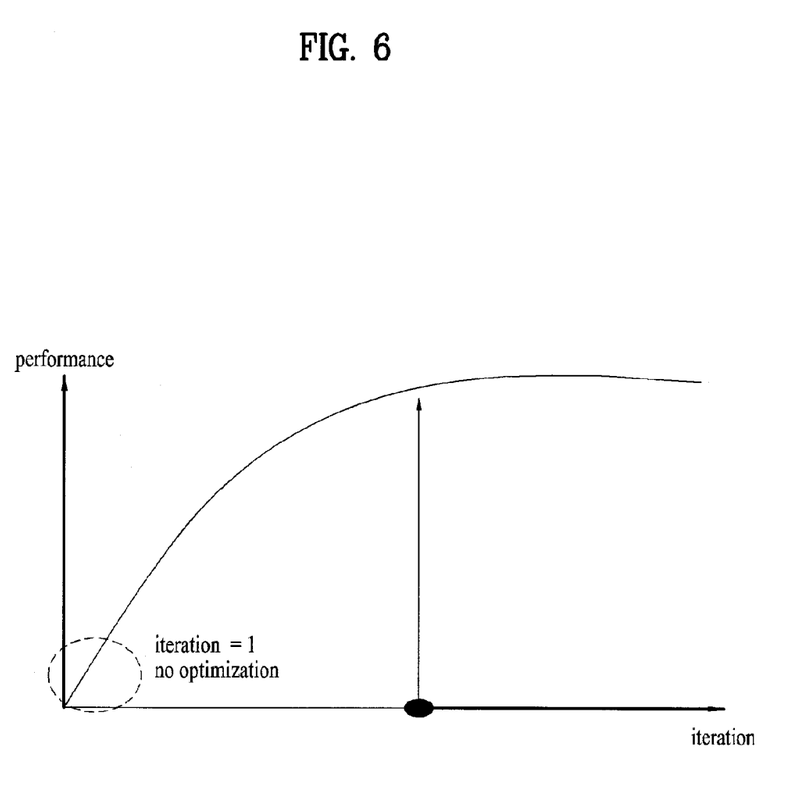
FIG. 6 is a graph showing a result of performing operations according the embodiment of the present invention on the documents included in a database.

FIG. 6 shows a result of performing operations according the embodiment of the present invention on the documents included in the database. It is seen that, as the number of iterations increases, values of the reference document T referenced by the subject document S changes less. Therefore, the value of the reference document T may be obtained from the number of iterations, changes in values of reference document T referenced by the subject document S, or a threshold value of values of the reference document T referenced by the subject document S.

In the above experiment, about 20,000,000 articles included in the database are used. However, the evaluation according to the embodiment may be performed only on the articles having at least one reference document overlapped with that of the subject document S or on articles extracted based on the criteria of the same technical field or the same author as that of the subject document S.

Now, an experiment conducted for evaluating effects of the embodiment of the present invention and results thereof will be described. In order to compare the values of the reference documents determined according to the embodiment of the present invention with importance of reference documents subjectively determined by an author of each of the documents, an experiment has been conducted as below.

Lead authors of articles published in international journals from 2007 to 2011 (registered in SCI or SCOPUS) participated in the experiment, such that they evaluated importance of references in their articles to rank the references from the first to fifteenth, with two or more articles being allowed to have the same rank.

The importance may be determined based on the following.

1) An article that essentially contributed to progress in a corresponding field and provided an author's article with a direct idea has the highest importance.

2) An article that essentially contributed to progress in a corresponding field but did not provide with an important idea to an author's article has the second highest importance.

3) An article that did not essentially contribute to progress in a corresponding field but provided with an important idea to the author's article has the third highest importance.

4) An article that provided with an important review to a corresponding field has the fourth highest importance.

5) Other articles that an author deemed important have the next importance.

FIG. 7 illustrates an evaluation result of degrees of influence of reference documents on the subject document S, in order to verify effects of the embodiment of the present invention.

In this example, the subject document S is "*Synthesis of Phosphor Photonic Crystals by Self-Assembly of SiO2OY2O3:Tb3+ Core/Shell Particles and Its Photoluminescence Properties.*"

The first column represents identifiers (indicated by reference documents IDs) of reference documents of the subject document S. In the first column, upper documents have higher values calculated by the scheme according to the embodiment of the present invention.

The second column exemplifies values indicating values or degrees of influence of reference documents calculated according to the equations described above.

The third column represents the numbers of times that each of the reference documents has been referenced by the documents stored in the database. For example, the document in the first row has been referenced 6,597 times, and the document in the second row has been referenced 4,408 times.

The fourth column represents importance rankings evaluated by the author of the subject document S. The importance of the reference documents, evaluated by the author with respect to the contents of the subject document S, is determined based on how much each of the reference documents influenced the subject document S. For example, the author determined that the reference documents in the first and second rows have the second highest influence, and commented that "The document is the first to find and report a basic phenomenon." Further, for the document in the third row, the author commented that "The document is the first to realize and report the essential part of the experiment," which is evaluated as the document with the fifth highest value according to the embodiment of the present invention. Although the documents in the fourth and fifth rows are not evaluated by the author, they are determined as important documents in the reference relationships among the reference documents stored in the database.

As can be seen, since the importance of reference documents evaluated by the author and that of the embodiment of the present invention substantially agree, even solely by a result of evaluation of the reference documents according to the embodiment of the present invention, documents having much influence on the subject document S may be identified.

Figure 8:
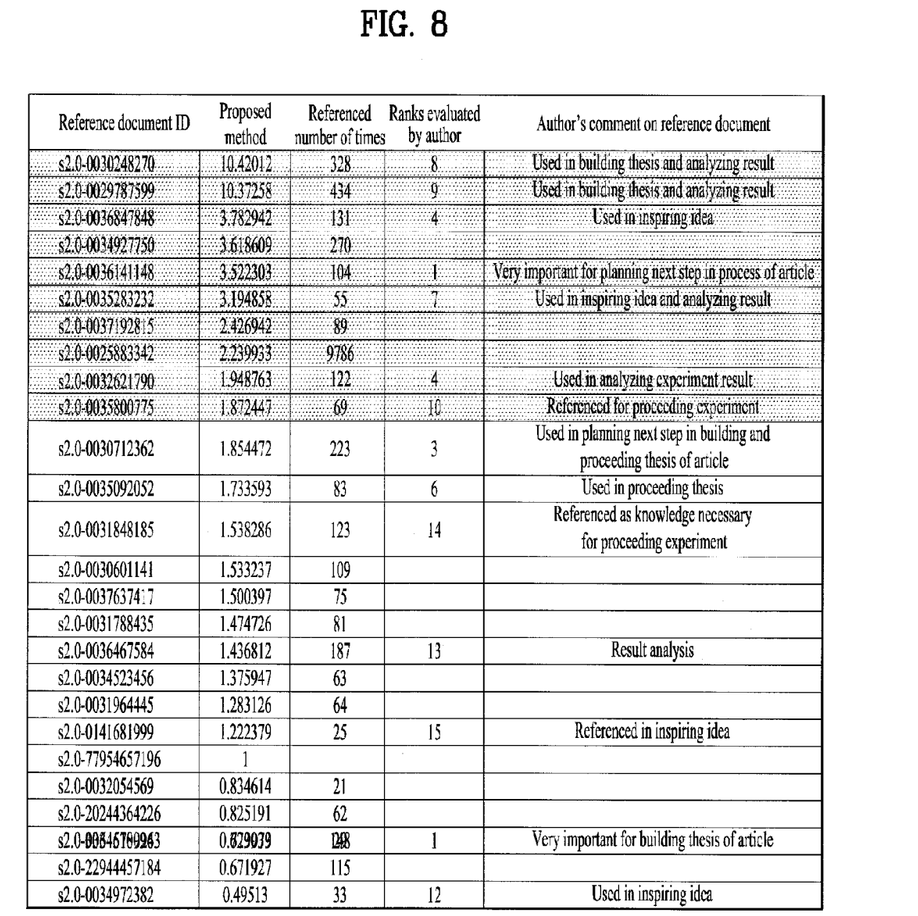
FIG. 8 is another table showing an evaluation result of influence of reference documents on the certain document, for verifying the embodiment of the present invention.

FIG. 8 illustrates another evaluation result of degrees of influence of reference documents on the subject document S, in order to verify effects of the embodiment of the present invention.

In this example, the subject document S is "*Suppression of iNOS expression by fucoidan is mediated by regulation of p38 MAPK, JAK/STAT, AP-1 and IRF-1, and depends on up-regulation of scavenger receptor B1 expression in TNF-α- and IFN-γ-stimulated C6 glioma cells.*"

The first column represents identifiers (indicated by reference documents IDs) of reference documents of the subject document S. In the first column, upper documents have higher values calculated by the scheme according to the embodiment of the present invention.

The second column exemplifies values indicating values or degrees of influence of reference documents calculated according to the equations described above.

The third column represents the numbers of times that each of the reference documents has been referenced by the documents stored in the database. For example, the document in the first row has been referenced 328 times, the document in the second row has been referenced 434 times, and the document in the eighth row has been referenced 9,786 times.

The fourth column represents importance rankings evaluated by the author of the subject document S.

In this example, the author evaluated the reference document in the first row as the document having the eighth highest value for the reason that "The document is used in building the hypothesis and interpreting the result." Further, the author evaluated the reference document in the second row as the document having the ninth highest value.

Further, the author evaluated the reference document in the fifth row as the document having the highest value for the reason that "The document was very important in planning the next step in the process of the article." According to the embodiment of the present invention, important reference documents may be identified by evaluating values of the reference documents, without considering substantial parts of the reference documents which are subjectively evaluated by the author.

In this example, although the author did not evaluate the reference document in the eighth row, according to the embodiment of the present invention, an important reference document, not evaluated by the author, may also be identified and indicated by using reference relationships in the database.

Figure 9:
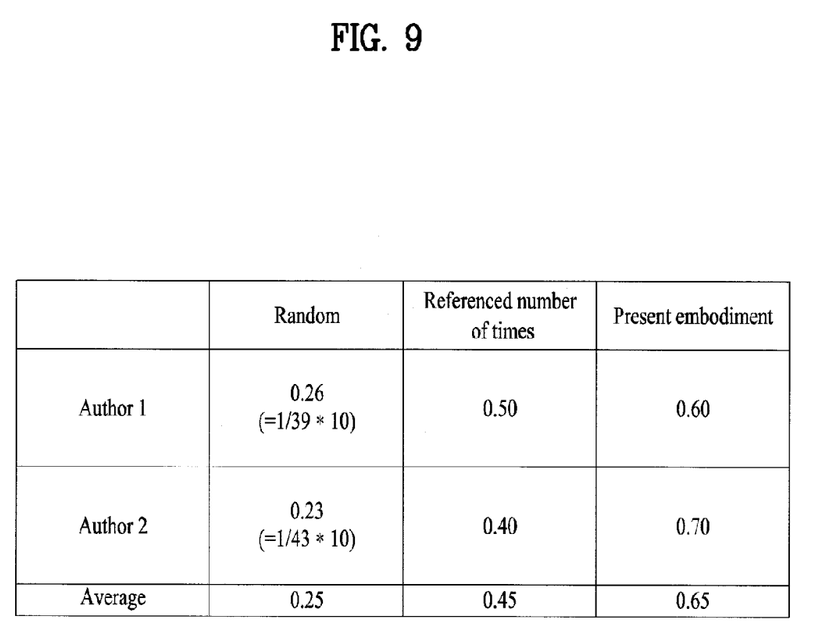
FIG. 9 is diagram illustrating degrees of accuracy of evaluating values of reference documents for the certain document.

FIG. 9 shows accuracy of evaluation of the reference documents for the subject document S according to examples in FIGS. 7 and 8. Here, degrees of agreement among values of reference documents in the top 10 are considered, a result of which is represented as ROC-10.

Figure 10:
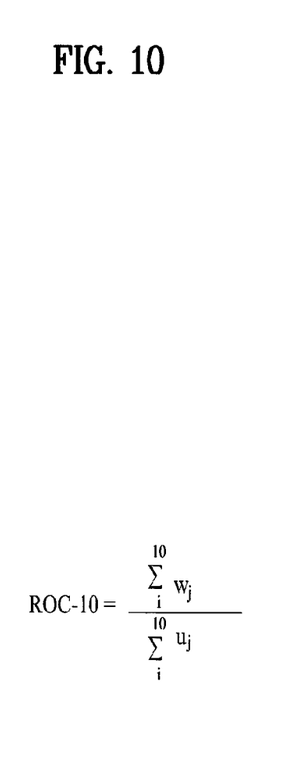
FIG. 10 is a view of an expression for calculating ROC-10.

ROC-10 is calculated using the expression shown in FIG. 10. The expression represents a probability that ten important documents selected by an author and ten documents according to the embodiment of the present invention agree.

In this regard, the reference documents of the documents in FIGS. 7 and 8 are 39 and 43, respectively. In FIG. 9, the author of the subject document S in FIG. 7 is denoted as author 1, and the author of the subject document S in FIG. 8 is denoted as author 2.

Probabilities that reference documents randomly evaluated and documents evaluated by the authors in the top ten agree are 0.26 (1/39*10) in FIG. 7 and 0.23 (1/43*10) in FIG. 8, respectively, the average of which is 0.25.

Probabilities that reference documents evaluated by the number of times that the documents were referenced and documents evaluated by the authors in the top agree are 0.50 in FIG. 7 and 0.40 in FIG. 8, respectively, the average of which is 0.45.

Probabilities that reference documents evaluated according to the embodiment of the present invention and documents evaluated by the authors in the top ten agree are 0.6 in FIG. 7 and 0.7 in FIG. 8, respectively.

FIG. 10 shows an expression to be used to calculate ROC-10. The expression in FIG. 10 represents a probability that ten important documents selected by an author and the ten documents evaluated according to the embodiment of the present invention agree.

In case of ten documents (i=10), $U_i$ is 1 if a document selected by an author is in the top 10; and is 0 otherwise. $W_i$ is 1 if a reference document is in the top 10 evaluated according to the embodiment of the present invention and also in the top 10 selected by the author; and is 0 otherwise.

Figure 11:
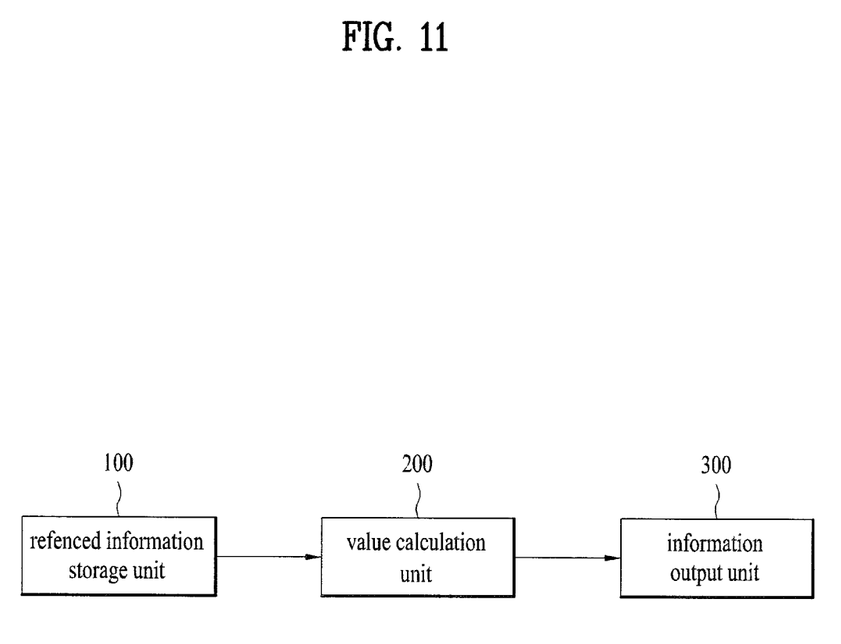
FIG. 11 is a block diagram illustrating an apparatus of evaluating a value of reference information according to the embodiment the present invention.

FIG. 11 illustrates an apparatus for evaluating a value of reference information according to the embodiment of the present invention. The apparatus includes a reference information storage unit 100, a value calculation unit 200, and an information output unit 300.

The reference information storage unit 100 may store information documents, information about the information documents, and information about documents having reference relationships with the information documents.

The value calculation unit 200 calculates reference relationships among reference documents for the subject document S by using the information documents stored in the reference information storage unit 100 or the reference relationships, when a user requests values of reference documents for the subject document S.

Such a calculation may be obtained using Equations 1 or 3.

When Equation 1 is used, a value of the first reference document among the reference documents of the subject document S may be calculated. In order to calculate the value of the first reference document among the reference documents of the subject document S, similarity values ($\overrightarrow{aS}$, $\overrightarrow{bS}$, $\overrightarrow{cS}$, $\overrightarrow{dS}$) of reference relationships between the subject document S and each of the neighbor documents are calculated using a bibliographic coupling and the like. Then, a sum of similarity values of reference relationships between the certain document and each of the neighbor documents is calculated (the first calculation value).

Then, the similarity values ($\overrightarrow{aS}$, $\overrightarrow{bS}$, $\overrightarrow{cS}$, $\overrightarrow{dS}$) of reference relationships between the certain document and each of the neighbor documents calculated by a bibliographic coupling and the like are respectively multiplied by values ($\overrightarrow{aT}$, $\overrightarrow{bT}$, $\overrightarrow{cT}$, $\overrightarrow{dT}$) of reference information of the first reference document for each of the neighbor documents. Then, respective multiples of the similarity values of reference relationships for reference documents by values of reference relationships of each of the neighbor documents are summed (the second calculation value).

A ratio of the second calculation value to the first calculation value is calculated as a value of the first reference document for the subject document S in the first step.

The scheme of calculating the value of the first reference document for the certain document in the first step is applied to reference documents other than the subject document S, so that the values of the reference documents other than the subject document S are updated and stored in the reference information storage unit 100.

The calculation is repeated N times for each of the reference documents so that a result value of reference information or a resultant value of reference relationships is calculated.

The information output unit 300 indicates to a user a resultant value of the first reference document for a subject document of the user's choosing.

Figure 12:
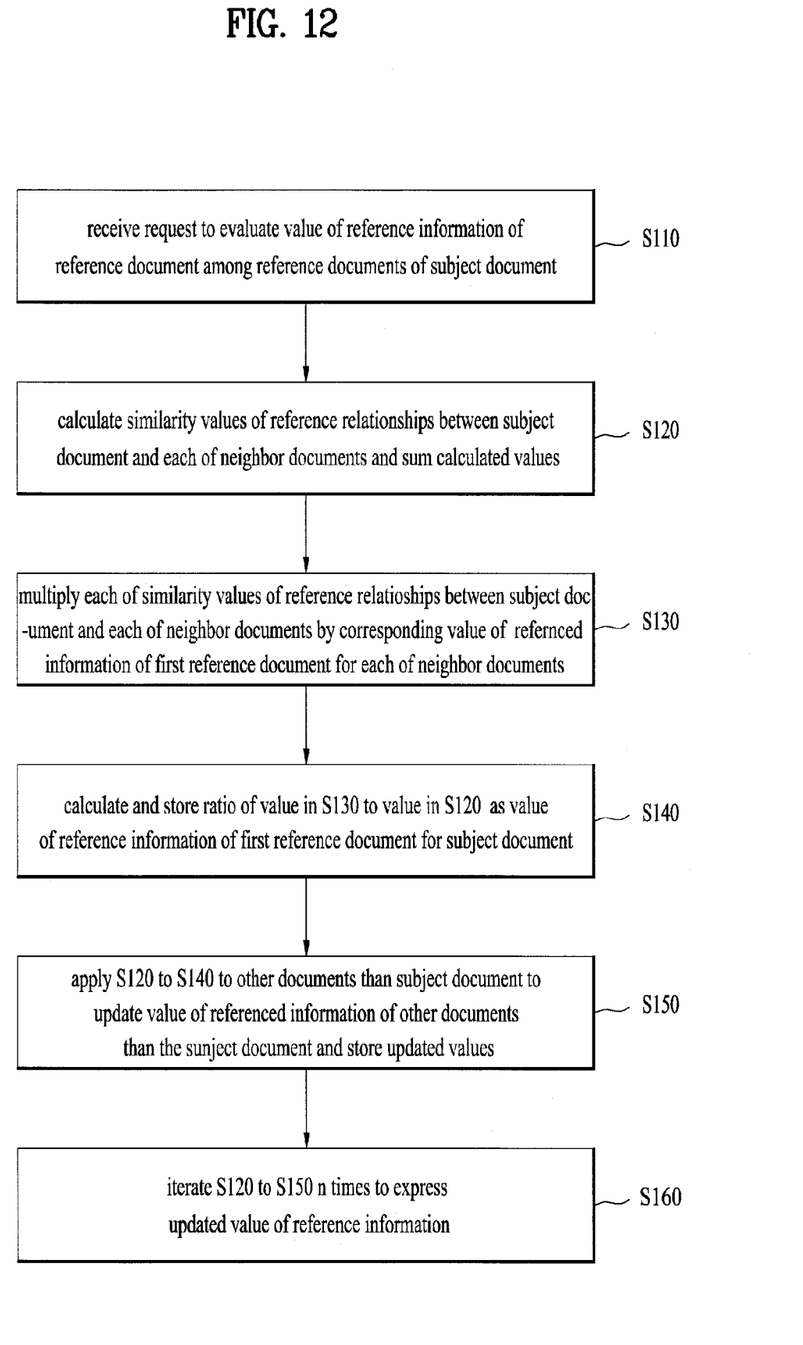
FIG. 12 is a flowchart illustrating a method of evaluating a value of reference information according to the embodiment of the present invention.

FIG. 12 illustrates a method of evaluating a value of reference information according to the embodiment of the present invention.

A request is received to evaluate a reference information value of the first reference document among the reference documents of the subject document S (S110). The reference documents refer to documents having reference relationships with the subject document S.

Similarity values of reference relationships between the subject document S and each of neighbor documents are calculated, and summed (S120). For example, similarity values of reference relationships between the subject document S and each of the neighbor documents may be calculated using a bibliographic coupling. The neighbor documents mean they reference the same document as the subject document, with respect to the relationship between the subject document S and a reference document to be evaluated.

The similarity values of reference relationships between the subject document S and each of the neighbor documents calculated in S120 are respectively multiplied by the value of reference information value of the first reference document for each of the neighbor documents and summed (S130). Here, as the value of reference information of the first reference document for each of the neighbor documents, an initial value may be used. The initial value may be a value of "1/the number of reference documents."

A ratio of the value in S130 to the value in S120 is calculated as the value of reference information value of the first reference document for the subject document S and stored (S140). The value of reference information value of the first reference document for the subject document S according to Equation 1 may be updated by S140.

By applying S120 to S140 to reference documents other than the subject document S, values of reference information value of the reference documents other than the subject document are updated and stored (S150).

S120 to S150 are iterated N times, and values of reference information value updated by the iteration is outputted (S160).

Another embodiment of the present invention provides a storage medium storing a program of evaluating a value of reference information, that receives a request to evaluate a value of reference information of a first reference document for the subject document from a user, calculates similarity values of reference relationships between the subject document and each of neighbor documents which are other document than the first reference document, and performs operations including a first calculation step of summing the calculated similarity values to calculate a first sum, a second calculation step of multiplying each of the similarity values of reference relationships between the subject document and each of the neighbor documents by a corresponding value of reference information of the first reference document for each of the neighbor documents and summing the multiplied values to calculate a second sum, and a step of using a ratio of the second sum to the first sum to update the initial value of the value of reference information of the first document for the subject document.

The program may perform the operations on the reference documents to update values for reference information of the reference documents, and store the updated values. The program may calculate similarity values of reference relationships between the subject document and each of the neighbor documents using a bibliographic coupling.

The program may allow the updated value to be indicated as value of reference information of the first reference document for the subject document.

The embodiments of the present invention may be used for evaluating values, influences, or importance of reference documents, calculating article influence score, tracking related papers, bibliographic coupling, finding main path of a knowledge stream, and calculating eigen factor score, for research achievement analysis, patent index analysis, information service accompanied by evaluation of reference documents, and article index analysis, etc.

According to embodiments of the present invention, values of reference documents for an information document may be objectively evaluated.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of evaluating a value of reference information, the method comprising:
    a first step of receiving a request to evaluate a value of reference information of a first reference document among reference documents of a subject document;
    a second step of calculating similarity values of reference relationships between the subject document and each of neighbor documents, respectively, and summing the calculated similarity values to calculate a first sum, the neighbor documents referencing the first reference document;
    a third step of multiplying each of the similarity values of reference relationships between the subject document and each of the neighbor documents by a corresponding value of reference information of the first reference document for each of the neighbor documents, and summing the multiplied values to calculate a second sum;
    a fourth step of updating an initial value of a value of the reference information of the first reference document for the subject document by using a ratio of the second sum to the first sum to; and
    a fifth step of applying the second to fourth steps to the reference documents, to update values of the reference information for each of the reference documents.

2. The method according to claim 1, wherein the similarity values of reference relationships between the subject document and each of the neighbor documents are calculated using a bibliographic coupling.

3. The method according to claim 1, further comprising iterating the second to fifth steps at least one time.

4. The method according to claim 1, further comprising outputting the updated values in the fifth step as values of reference information of the first reference document for the subject document.

5. An apparatus for evaluating a value of reference information, the apparatus comprising:
    a reference information storage module for storing initial values of values for reference information of reference documents for a subject document;
    a value calculation module for receiving a request to evaluate a value of reference information of a first reference document for the subject document from a user, for calculating similarity values of reference relationships between the subject document and each of neighbor documents, the neighbor documents referencing the first reference document, and for performing operations including a first calculation step of summing the calculated similarity values to calculate a first sum, a second calculation step of multiplying each of the similarity values of reference relationships between the subject document and each of the neighbor documents by a corresponding value of reference information of the first reference document for each of the neighbor documents and summing the multiplied values to calculate a second sum, and a step of updating the initial value of the value of reference information of the first document for the subject document by using a ratio of the second sum to the first sum; and
    an information output module for outputting the value of reference information of the first reference document for the subject document by using the ratio of the second sum to the first sum.

6. The apparatus according to claim 5, wherein the value calculation module performs the operations on the reference documents to update values for reference information of the reference documents, and stores the updated values in the reference information storage module.

7. The apparatus according to claim 5, wherein the value calculation module calculates the similarity values of reference relationships between the subject document and each of the neighbor documents using a bibliographic coupling.

8. The apparatus according to claim 6, wherein the value calculation module iterates the operations at least one time to update the value of reference information of the first reference document for the subject document, and stores the updated value in the reference information storage module.

\* \* \* \* \*